Aug. 31, 1926.
A. C. CARTER
EJECTOR FORK
Filed Jan. 28, 1926
1,598,422
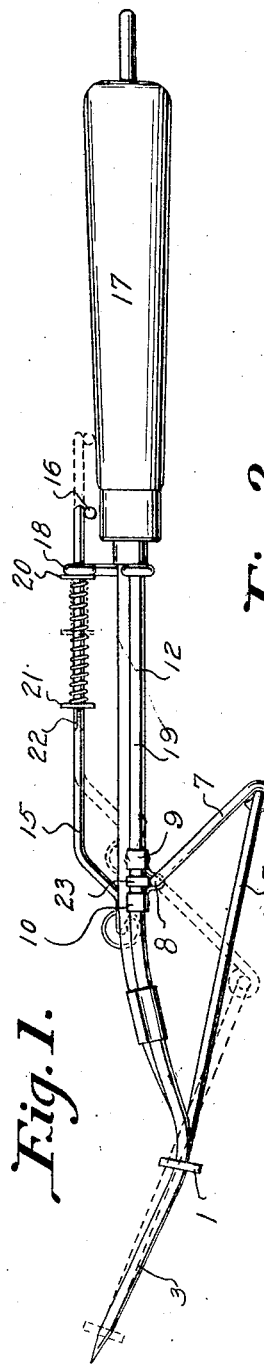
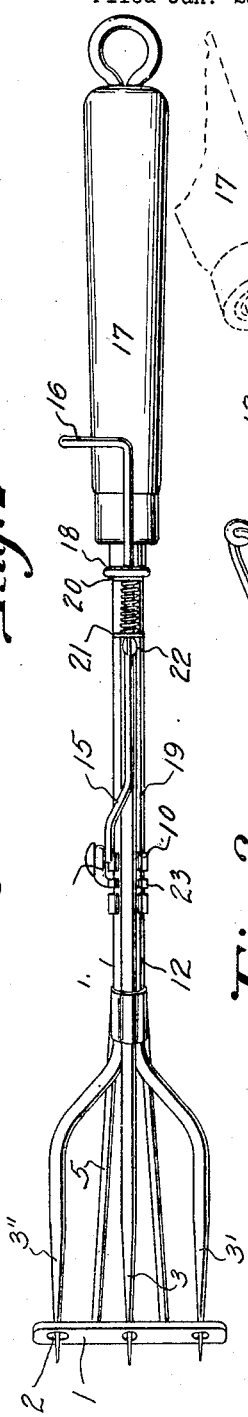
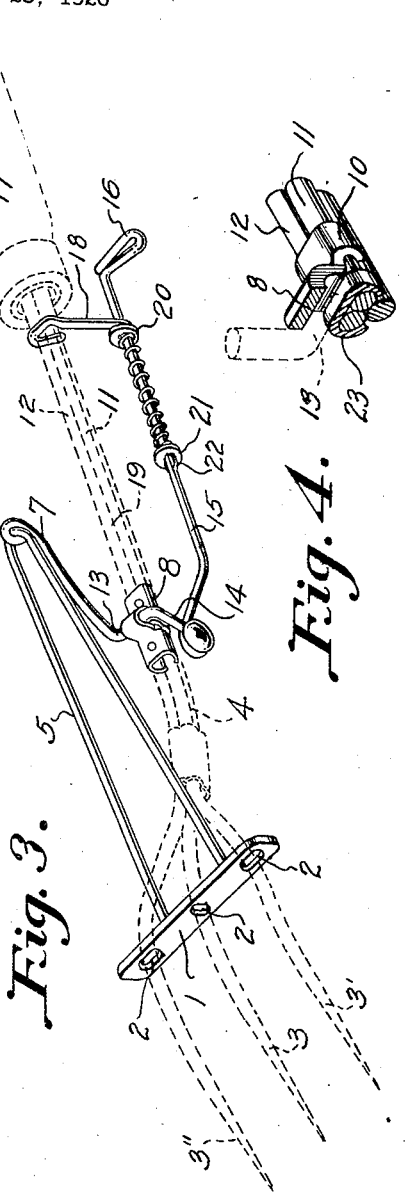
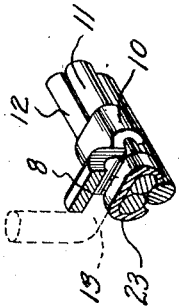
INVENTOR.
Albert C. Carter.
BY James N. Ramsey
ATTORNEY.

Patented Aug. 31, 1926.

1,598,422

UNITED STATES PATENT OFFICE.

ALBERT C. CARTER, OF NORWOOD, OHIO.

EJECTOR FORK.

Application filed January 28, 1926. Serial No. 84,413.

The invention relates to forks used in handling foods.

The objects of my invention are to provide simple, efficient, practical, convenient and easily operated means for ejecting food from a fork by a very slight movement of either the thumb or finger of the hand which holds the fork, leaving the other hand free for other duties; and to provide means whereby the ejector is operated by a pull movement and whereby the thumb or finger controlling said movement moves a much shorter distance than the movement of the ejector so that the tines of the fork may be easily withdrawn from food without taking a second grip on the fork handle.

My invention consists in providing an ejector which is pivotally connected to a trigger mounted upon the shank of the fork.

My invention also consists in the peculiar construction, combination, arrangement and location of parts, as herein set forth and claimed.

In the drawings:

Fig. 1 is a side elevation of a fork with the ejector and trigger in contracted position, ready for impaling the food, the dotted lines showing the position of the ejector and trigger after the food has been ejected;

Fig. 2 is a front elevation showing the ejector in extended position after the food has been ejected;

Fig. 3 is a perspective view partly broken away showing the fork in dotted lines and the novel attachment in full lines in position ready for the tines to impale the food and to eject the food after it has been impaled; and Fig. 4 is a sectional perspective of the bearing and filler clips and shank of the fork showing a portion of the rocker-arm in dotted lines.

In the embodiment of the invention, as illustrated, and which shows the preferred construction, I provide an ejector plate 1 having holes 2 through which the tines 3 of fork 4 project and on which said plate is slidably mounted. The end holes of said plate which receive the outer tines are preferably oval and elongated longitudinally of said plate, while the center-hole is elongated and preferably oval and extends transversely of said plate in order to provide for variation in the location of said tines relative to each other and thereby prevent binding of said plate upon the tines as it is being operated in either direction on said tines. Bifurcated arm 5 has its two branches or arms suitably attached to said plate as by spot welding and its bent or curved end 6 is pivotally attached to rocker-arm 7 which is pivotally mounted in bearing 8 of clip 9, which has curved flanges 10 embracing the stems 11 and 12 of outer tines 3' and 3''. Said clip is suitably held in fixed position as by spot welding to shank 19 thereby welding and binding the parts of shank 19 together and thus strengthening it. Filler clip 23 is clamped over shank 19 beneath clip 9 and serves to support rocker-arm 7 and to prevent its lever-arm 14 from catching upon spaced apart curved flanges 10 of clip 9. Rocker-arm 7 is extended downwardly at right angles from its pivot portion 13 to form crank or lever arm 14, to the lower end of which ejector actuating-stem 15 is pivotally attached. The other end of said actuating-stem 15 is provided with a thumb or finger-catch 16 bent at an angle thereto and preferably extended toward the left side of the fork-handle 17 when it is held in position for use, as shown in Fig. 3. The free end of said actuating-stem is slidably mounted in support 18 in spaced apart relation from the fork handle, as shown, and said support is suitably mounted upon shank 19 as by bending it therearound and spot welding it thereto, as clearly shown in Fig. 3. A coiled compression spring is mounted upon and encircles said ejector actuating stem and is confined between washer 20 on said actuating stem bearing against said support and washer 21 held in position by ribs or lugs 22 pressed out near the center of said ejector actuating stem.

It will be apparent that my invention is capable of modification without departure from its scope or spirit as defined in the claims, as for instance, if desired, the attachment may be suitably applied to a fork having only two tines in which some slight changes in the construction would be made but the general principle and operation of the device would be the same.

The operation of the invention is very simple and convenient. The spring automatically holds the ejector-plate in contracted position ready for the tines to impale the food and when it is desired to eject the food it is only necessary, without shifting the hand-hold upon the fork handle, to merely press the thumb or forefinger against the catch and pull the ejector actuating-stem toward the hand a short distance, thereby conveniently and efficiently ejecting the food without the necessity of using both hands for such purpose, or of shifting the hand holding the fork from its original and firm position upon the fork handle.

Thus it is seen that I have provided a standard kitchen fork with an ejecting device attached which permits all food to be ejected from the tines with one hand and this is practically indispensable in the handling of all food where a fork is used. Steaks, chops, roasts, fowls, fish and vegetables, after being turned or placed in the desired position may be removed from this fork without the aid of another hand or utensil, thus eliminating the old manner of shaking off the food which usually drops back into the hot grease or water, splashing it on the hands and producing painful burns. The fork provided with my ejector is easily and quickly removed regardless of how deep it is thrust into the food. It is adapted to transfer potatoes and other vegetables to the table dishes whole and not in pieces.

My ejecting device is always in position ready for use and is automatically returned to that position after each ejection. The operation of the device is rendered very easy and convenient by reason of the pull-movement, rather than a push-movement; also the trigger and lever action secures a longitudinal throw or movement of the device to eject the food by a very short pull in the ratio of about 3 to 1 and the lever action renders the operation easier.

Another advantage of the invention is its adaptability to be attached to a two or three tined fork, as desired.

What I claim as new and desire to secure by Letters Patent is:

1. In combination with a three-tine fork, an ejector attachment comprising a suitably mounted reciprocable ejector plate having elongated end holes extending longitudinally of said plate to receive the side tines and permit free, non-binding movement of said tines therein and give a close fit thereof transversely of said plate when said plate is reciprocated upon said tines and said plate having an elongated central hole extending transversely thereof adapted to receive the central tine and permit free non-binding movement of said tine therein and give a close fit thereof longitudinally to said plate when said plate is reciprocated thereon, substantially as set forth and for the purposes specified.

2. In combination with a three-tine fork, an ejector attachment comprising a suitably mounted reciprocatable ejector plate having oval end holes extending longitudinally of said plate to receive the side tines and permit free non-binding movement of said tines therein and give a close fit thereof transversely of said plate when said plate is reciprocated upon said tines and said plate having an oval central hole extending transversely thereof adapted to receive the central tine and permit free non-binding movement of said tine therein and give a close fit longitudinally of said plate when it is reciprocated thereon whereby said plate is permitted to be freely reciprocated upon said tines and is held from excessive transverse movement by said side tines.

3. In combination with a fork having three curved tines, an ejector attachment comprising a suitably mounted reciprocatable ejector plate having oval end holes extending longitudinally of said plate to receive the side tines and permit free non-binding movement of said tines therein and give a close fit thereof transversely of said plate when said plate is reciprocated upon said tines and said plate having an oval central hole extending transversely thereof adapted to receive the central tine and permit free non-binding movement of said tine therein and give a close fit longitudinally of said plate when it is reciprocated thereon whereby said plate is permitted to be freely reciprocated upon said tines and is held from excessive longitudinal movement by said central tine and from excessive transverse movement by said side tines.

4. In combination with a fork having three tines, an ejector plate having a hole for each tine and slidably mounted thereon, a bifurcated arm fixed to said plate between the outer and central tines, respectively, at one end, a rocker-arm pivotally attached to said bifurcated arm at the other end, means for mounting said rocker-arm, and means for reciprocating said bifurcated arm whereby it is moved forward and backward between said tines, substantially as set forth.

5. In combination with a fork having an elongated transverse bearing on its shank, an ejector plate slidably mounted on the tines of said fork, an arm fixed to said ejector plate, a rocker-arm having a transverse part mounted in said transverse bearing and connected to said arm at one end and having a crank or lever at its other end, and means for operating said rocker-arm.

6. In combination with a fork, an ejector plate, an arm secured thereto, a rocker-arm pivotally attached to said arm, a clip having a transverse bearing in which said rocker-arm is pivotally mounted centrally of the shank of said fork and having flanges embracing said shank with means for holding it in fixed position, and a pull-stem pivotally attached to said rocker-arm and adapted to be manually operated in one direction and automatically operated in the reverse direction.

7. In combination with an ejector fork, an ejector plate, a bearing clip embracing and secured to the shank of said fork, a filler clip mounted upon said fork beneath said bearing clip and embracing the shank of said fork between the flanges of said bearing clip, a rocker-arm mounted in said bearing clip upon said filler-clip and pivotally connected to said ejector plate, an actuating stem pivoted to said rocker-arm the arms of said filler-clip being adapted to engage the crank of said rocker-arm and prevent it from catching on said bearing-clip, substantially as set forth and for the purpose specified.

ALBERT C. CARTER.